US00RE44722E

(19) United States
(12) Reissued Patent
Wu et al.

(10) Patent Number: US RE44,722 E
(45) Date of Reissued Patent: Jan. 21, 2014

(54) EFFICIENT USE OF EXCEPTIONS IN TEXT SEGMENTATION

(75) Inventors: Enyuan Wu, Bellevue, WA (US); Alan K. Michael, Monroe, WA (US); Marcus A. Taylor, Bonney Lake, WA (US); Beom Seok Oh, Fall City, WA (US); Shusuke Uehara, Redmond, WA (US)

(73) Assignee: Microsoft Corporation, Redmond, WA (US)

(21) Appl. No.: 13/608,446

(22) Filed: Sep. 10, 2012

Related U.S. Patent Documents

Reissue of:
(64) Patent No.: 8,086,442
Issued: Dec. 27, 2011
Appl. No.: 12/968,348
Filed: Dec. 15, 2010

(30) Foreign Application Priority Data

Nov. 25, 2010 (CA) ..... 2721498

(51) Int. Cl.
*G06F 17/20* (2006.01)
*G06F 17/27* (2006.01)

(52) U.S. Cl.
USPC ..... 704/9; 704/1

(58) Field of Classification Search
USPC ..... 704/1, 9, 1.9
See application file for complete search history.

(56) References Cited

U.S. PATENT DOCUMENTS

| | | | |
|---|---|---|---|
| 4,994,966 | A | 2/1991 | Hutchins |
| 5,379,373 | A | 1/1995 | Hayashi et al. |
| 5,572,732 | A | 11/1996 | Fant et al. |
| 5,802,533 | A | 9/1998 | Walker |
| 6,188,977 | B1 | 2/2001 | Hirota |
| 6,223,150 | B1 | 4/2001 | Duan et al. |
| 6,574,644 | B2 | 6/2003 | Hsu et al. |
| 7,523,125 | B2 | 4/2009 | Zeng |
| 7,548,848 | B1 | 6/2009 | Deb et al. |
| 7,668,718 | B2 | 2/2010 | Kahn et al. |
| 7,827,188 | B2 | 11/2010 | Howard et al. |
| 7,937,344 | B2 | 5/2011 | Baum et al. |
| 2004/0225999 | A1 | 11/2004 | Nuss |
| 2005/0108001 | A1 | 5/2005 | Aarskog |
| 2006/0149558 | A1 | 7/2006 | Kahn et al. |
| 2007/0208755 | A1 | 9/2007 | Bhatkar et al. |

OTHER PUBLICATIONS

Zydroń, Andrzej., "Reference Model for Open Architecture for XML Authoring and Localization Version 1.0", Retrieved at <<http://docs.oasis-open.org/oaxal/V1.0/cd01/oaxal-v1.0-cd01.html>>, Mar. 20, 2009, 27 pages.

(Continued)

*Primary Examiner* — Eric Yen

(57) ABSTRACT

Input text may be broken into sentence, or other types of segments, by first detecting exceptions in the input text, and then detecting break positions. Given a segment breaking scheme that comprises a set of break rules and a set of exceptions, a regular expression is created that represents the break rules, and another regular expression is created that represents the exceptions. The input text is analyzed to identify strings that match any exception, and the matching strings are substituted with placeholders that are not likely to occur naturally in the input. The resulting text, with substitutions, is then evaluated to find the positions in the text that match the break rules. Those positions are declared to be segment breaks, and the placeholders are then replaced with the original strings. The result is the original text, with breaks assigned to the appropriate positions in the text.

20 Claims, 6 Drawing Sheets

(56) References Cited

OTHER PUBLICATIONS

"Man Pages Section 5: Standards, Environments, and Macros", Retrieved at <<http://docs.sun.com/app/docs/doc/816-5175/6mbba7evc>>, dated May 20, 2002, 6 pages.
Gintrowicz, et al., "Using Regular Expressions in Translation Memories", Retrieved at <<http://www.mt-archive.info/IMCSIT-2007-Gintrowicz.pdf>>, Proceedings of the International Multiconference on Computer Science and Information Technology, vol. 2, Oct. 15-17, 2007, pp. 87-92.
"Localization Definitions and Standards", Retrieved at <<http://www.sisulizer.com/localization/support/localization-glossary.shtml>>, Retrieved Date: Aug. 25, 2010, 8 pages.
"Segmentation Rules", Retrieved at <<http://www.alchemysoftware.ie/livedocs/publisher30/general_options/configuring_xml_segmentation_rules.htm>>, Retrieved Date: Aug. 25, 2010, 2 pages.
"Add/Edit Segmentation Rule", Retrieved at <<http://producthelp.sdl.com/SDL%20Trados%20Studio/client_en/Ref/A-G/AE_SegRul.htm>>, Retrieved Date: Aug. 25, 2010, 2 pages.
"Add/Edit Rule Exception", Retrieved at <<http://producthelp.sdl.com/SDL%20Trados%20Studio/client_en/Ref/A-G/AERulExc.htm>>, Retrieved Date: Aug. 25, 2010, 1 page.
Milkowski, et al., "Using SRX standard for sentence segmentation in LanguageTool," 4th Language & Technology Conference: Human Language Technologies as a Challenge for Computer Science and Linguistics, Nov. 6-8, 2009, 5 pages, Poznań, Poland.

EFFICIENT USE OF EXCEPTIONS IN TEXT SEGMENTATION

Matter enclosed in heavy brackets [ ] appears in the original patent but forms no part of this reissue specification; matter printed in italics indicates the additions made by reissue.

BACKGROUND

In natural language processing applications, such as translation between languages, one issue that arises is to break the input text into sentences. The general rule for breaking sentences is typically very simple—e.g., a word that ends with a period is the end of a sentence. However, the general rule is often swallowed by exceptions that can be both numerous and complex. For example, in English the string "Dr." ends with a period, but often is not the end of a sentence because it is the abbreviation for the title "Doctor." Strings like "U.S.", "etc.", and "A.D." might or might not be the last word in a sentence. In some cases, determining whether a string is, or is not, the end of a sentence involves looking at the words that precede and/or follow the word in question.

The rules to recognize the end of a sentence, as well as the exceptions, are often specified as regular expressions. Thus, in English the regular expression for the general end of sentence rule could specify that a matching string is one or more characters followed by a period (e.g., ".+\.", in a typical regular expression syntax). Additionally regular expressions can be used to specify the exceptions—e.g., "Dr\." to match the abbreviation for "Doctor", or "etc\. (?=[a-z])" to match "etc." when followed by a word beginning with a lowercase letter. One approach to using the general rule and the exceptions together is to find a match for the general rule, and then evaluate the match to determine whether there are matches for the exceptions. If there is a match for the general rule and for an exception, then the matching string is not the end of a sentence. If there is a match for the general rule but not for an exception, then the matching string is the end of a sentence. A problem with this technique is that it involves evaluating all of the exceptions for each string that matches the general rule. Thus, the number of operations involved in finding the sentence breaks may be proportional to the number of matches on the general rule times the number of exceptions, which is inefficient.

SUMMARY

Sentence breaks can be detected efficiently in the following manner. The formal description of a sentence break point may be defined by one or more general rules that define a sentence break, and one or more exceptions to those rules. Given such a set of general rules and exceptions, an input text is evaluated first for matches on the exceptions. Strings that match the exceptions are replaced with strings that are presumed not to occur naturally in the input text—e.g., each matching exception could be replaced with a string of the form "%%%<number>%%%". The correspondence between the original strings and the replacement strings is stored, so that the replacement strings can be changed back to their originals later.

After replacement has occurred on the exceptions, the text is evaluated for matches on the general rule. With the exceptions having been temporarily removed from the input, any matches on the general rule may be presumed to be true sentence breaks. Once the sentence breaks have been detected, the original strings that were removed from the text may be substituted for the replacement strings, resulting in the original text with the positions of sentence breaks being correctly identified. Since the exceptions can be evaluated once for the entire input text, instead of once for each possible sentence break, the input text can be divided into sentences relatively efficient, as compared with an algorithm that looks first for matches on the general rule.

One way implement the above technique is to combine all of the sentence break rules into one regular expression, and to combine all of the exceptions into another regular expression. Each of these regular expressions can then be compiled and can be run on the input text. That is, the regular expression containing the exceptions can be applied to the input text, with substitutions being made for any matching string. The regular expression containing the sentence break rules then can be applied to the text with the substituted strings, thereby allowing the rules and exceptions to be applied by matching the input text against two regular expressions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
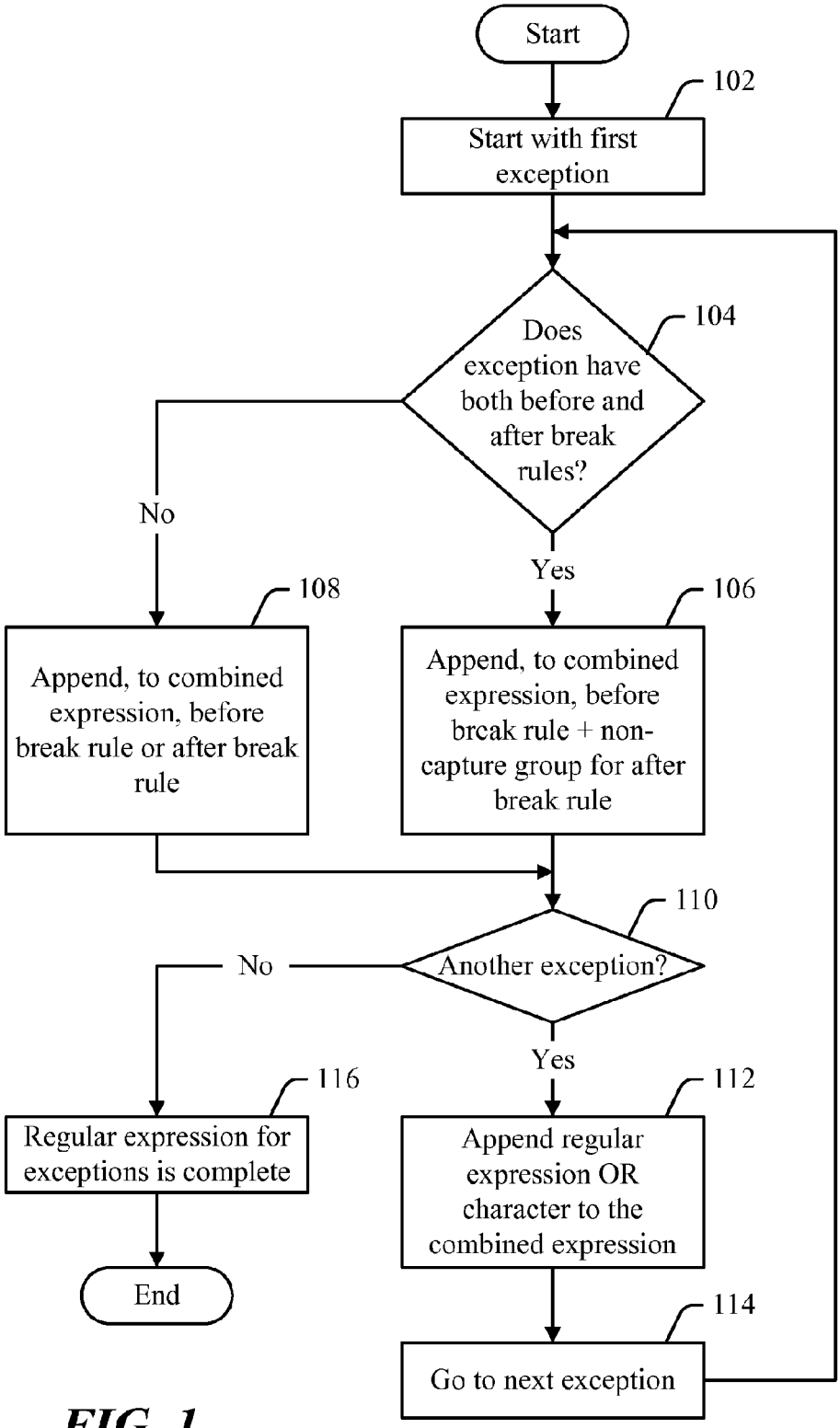
FIG. 1 is a flow diagram of an example process of combining break exceptions into a single regular expression.

Natural language processing applications often perform some type of segmentation on their input, such as breaking the input into sentences. The segmentation rules typically take the form of a small number of general rules, and a large number of exceptions. For example, in English the general rule for sentence breaking is that a word that ends with a period is the end of a sentence. However, there are a large number of exceptions to that rule. For example, "Dr." is the abbreviation for "Doctor", so the string "Dr." generally does not indicate the end of a sentence because it is followed by a doctor's name. The string "e.g." typically indicates that a list of examples is about to follow, so it is not normally the end of a sentence even though it ends with a period. The string "etc." often follows the end of a list, but such a list can occur either in the middle of a sentence or at the end, so whether "etc." is the end of a sentence generally depends on whether the word following "etc." begins with a capital or lowercase letter. Similar issues may apply with strings such as "U.S.", "A.D.", "Ph.D.", etc.

One way to apply a general rule together with exceptions is to analyze the input for matches on the general rule, and then determine whether the match also matches one of the exceptions. For example, if the input is "We have an appointment with Dr. Smith.", then when the input is scanned the string "Dr." will match on the general rule that a word ending with a period is the end of a sentence. That matching string ("Dr.") can then be compared to the known exceptions (e.g., "A.D.", "Ph.D.", "e.g.," "ad lib.", etc.) to determine whether it matches any of the exceptions. A problem that arises with this technique is that it is inefficient. Each time that a match on the general rule is encountered, the match has to be compared to the exceptions. When no exception applies to a match, this fact can only be known by comparing the match to every exception until the list of exceptions is exhausted. Thus, the number of comparisons that has to be done to break the input into segments is proportional to the number of sentence-break rules times the number of exceptions.

The subject matter described herein provides an efficient way to perform segmentation of input, such as sentence breaking. In order to detect the ends of sentences efficiently, the input is first evaluated to identify matches on the exceptions. Each matching exception is then replaced with a placeholder string that is unlikely to appear naturally in the input. The correspondence between the original string and the placeholder string is stored, so that the original strings subsequently can be substituted back into the input. After the exception matches have been replaced with placeholder strings, the new input (i.e., the original input, with placeholders having been substituted for exception matches) is analyzed to find matches on the general sentence-break rule(s). The locations of sentence breaks are then identified where matches on the general rules are found. The stored correspondence between original and placeholder strings is then used to substitute the original strings back into the input. The result of the process is to produce the original input, but with an identification of the locations of sentence breaks. This process is relatively efficient, because it can be performed by evaluating the input text once for all of the exceptions, and once for the general rules (followed by a post-processing phase in which placeholder strings are replaced with the original strings), rather than having to evaluate all of the exceptions each time a general rule is matched.

In one example, the break rules and the exceptions can be expressed as regular expressions. When the break rules and exceptions are expressed in this manner, one way to evaluate an input text for matches on the break rules and exceptions is to combine all of the break rules into a first regular expression, and to combine all of the exceptions into a second regular expression. The input text can then be evaluated for matches on the second regular expression, while substituting a placeholder string for any match to create a modified input text. The modified input text can then be matched against the first regular expression to determine the locations of the sentence breaks. The placeholder strings can then be replaced with their original strings.

Although the foregoing describes the subject matter herein in terms of finding sentence breaks, the techniques described herein may be used to perform any segmentation task that is defined by rules and exceptions.

Turning now to the drawings, FIG. 1 shows an example process of combining break exceptions into a single regular expression. Before turning to a description of FIG. 1, it is noted that the flow diagrams contained herein (both in FIG. 1 and in FIGS. 2-4) show examples in which stages of a process are carried out in a particular order, as indicated by the lines connecting the blocks, but the various stages shown in these diagrams can be performed in any order, or in any combination or sub-combination.

The process of FIG. 1 operates on the exception list for a set of break rules. Moreover, a string variable referred to as "combined expression" starts as an empty string, and accumulates the combined regular expression as it is constructed throughout the process. The process starts with the first exception at 102. For that exception, it is determined (at 104) whether the exception has both "before break" and "after break" patterns or rules. A "before break" pattern or rule is a pattern or rule that describes a string that would occur in the input prior to a detected break point, and an "after break" pattern or rule is a pattern or rule that describes a string that would occur after a detected break point.

For example, if the general sentence break rule is that a break occurs after any word that ends with a period (e.g., after any word that matches the regular expression ".+\."), then—for reasons described above—a string like "Dr." may be treated as an exception to the general rule. In one example, the string "Dr." is treated as a non-break whenever it occurs. In other words, any time the string "Dr." occurs in the input, the position in the text that immediately follows the string "Dr." is found to be a non-break point regardless of what occurs after that string. Therefore, the "Dr." exception has a "before break" part but no "after break" part, because there is nothing that has to be matched after the potential break point to determine whether the exception applies. In this example, the "before break" rule (in regular expression format) is "Dr\." (In the regular expression examples herein, the period character "." matches any character, and "+" indicates that the preceding term in the regular expression is matched one or more times. For characters that have these types of non-literal meanings, the backslash ("\") is an escape character that causes the following character to be treated as a literal. Thus, the regular expression "Dr." would match "D" followed by "r" followed by any character, while "Dr\." matches the specific string "Dr." This is a common format for regular expressions.)

The foregoing is an example of an exception that has only a before break rule but not an after break rule. However, an exception could have an after break rule but not a before break rule, or could have both before break and after break rules. The following is an example of an exception with both before break and after break rules. As discussed above, a term such as "etc." could appear either at the end of a sentence ("France has had many kings named Louis, such as Louis I, Louis II, Louis III, etc."), or at a non-end of a sentence ("Fluorine, chlorine, iodine, etc., are halogens.") Although the following rule is not perfect, one way to detect whether "etc." is at the end or non-end of a sentence is to look at the word following "etc." and to find that "etc." is the end of a sentence if the next word begins with a lowercase letter. Since a sentence starts with a capital letter, instances of "etc." that are followed by a lowercase letter can be understood as not being the end of a sentence). Thus, the "before break" part of the "etc." exception is a match on the regular expression "etc\.", and the "after break" part of the "etc." exception is a match on "\s+[a-z].*" ("[a-z] is a regular expression term that matches any lowercase letter; "*" indicates that the preceding character is matched zero or more times, so ".*" matches zero or more of any characters. "\s" matches any white space characters that would separate two words.) In other words, the string "etc." is declared to be an exception only if it is followed by a word that begins with a lowercase letter. It is noted that the foregoing example is a very simple way to detect whether "etc." is an exception to the general English sentence break rule, and additional criteria could be added to determine whether a given instance "etc." is an exception. For example, proper names are capitalized in the middle of sentences, so the rule might find that "etc." is an exception if it is followed either by a lowercase letter or a proper name. The exception can be made arbitrarily complex, depending on how much accuracy in detecting exceptions is sought.

Returning now to FIG. 1, it will be recalled that it is determined (at 104) whether an exception has a before break part, and after break part, or both. If both before and after break parts are present, then the process continues to 106 to construct an expression for the exception. The expression includes the before break part followed by a non-capture group containing the after break part. I.e., if "(?:expr)" is a regular expression that matches, but does not capture "expr", then "(?:expr)" is a "non-capture group" for "expr". Labeling the after break rule as a non-capture group simplifies the substitution of placeholders for exception matches (to be described below), since the placeholder may be substituted for the original expression on only the captured part of the match. This expression is appended to the "combined expression" string (which, as noted above, accumulates the regular expression as it is being constructed). Thus, in the example where the "etc." exception has the "before break" part of "etc\." and the "after break" part of "\s+[a-z].*", the expression that is constructed for this exception is "etc\.(?:\s+[a-z].*)", and this string may be appended to the combined rule.

If a given exception has only a "before break" or "after break" part, then the before break or after break part is simply appended to the "combined expression" string (at 108).

Regardless of whether the current exception contains a before part, an after part, or both, the process continues to 110 to determine whether there is another exception. If there are other expressions, then an "or" symbol may be appended to the combined expression (at 112), so that the next exception can be considered in the disjunctive with all of the previous exceptions. (In a typical regular expression language, the "or" symbol is the vertical bar "|".) The process then goes to the next exception (at 114), and returns to 104 so that the next exception can be added to the combined expression in the manner described above. If there are no additional exceptions to consider, then the combined expression contains the complete regular expression that describes all of the exceptions in the disjunctive (at 116), and the process ends. The resulting combined expression is a regular expression that matches any string that constitutes an exception to the sentence break rule.

Figure 2:
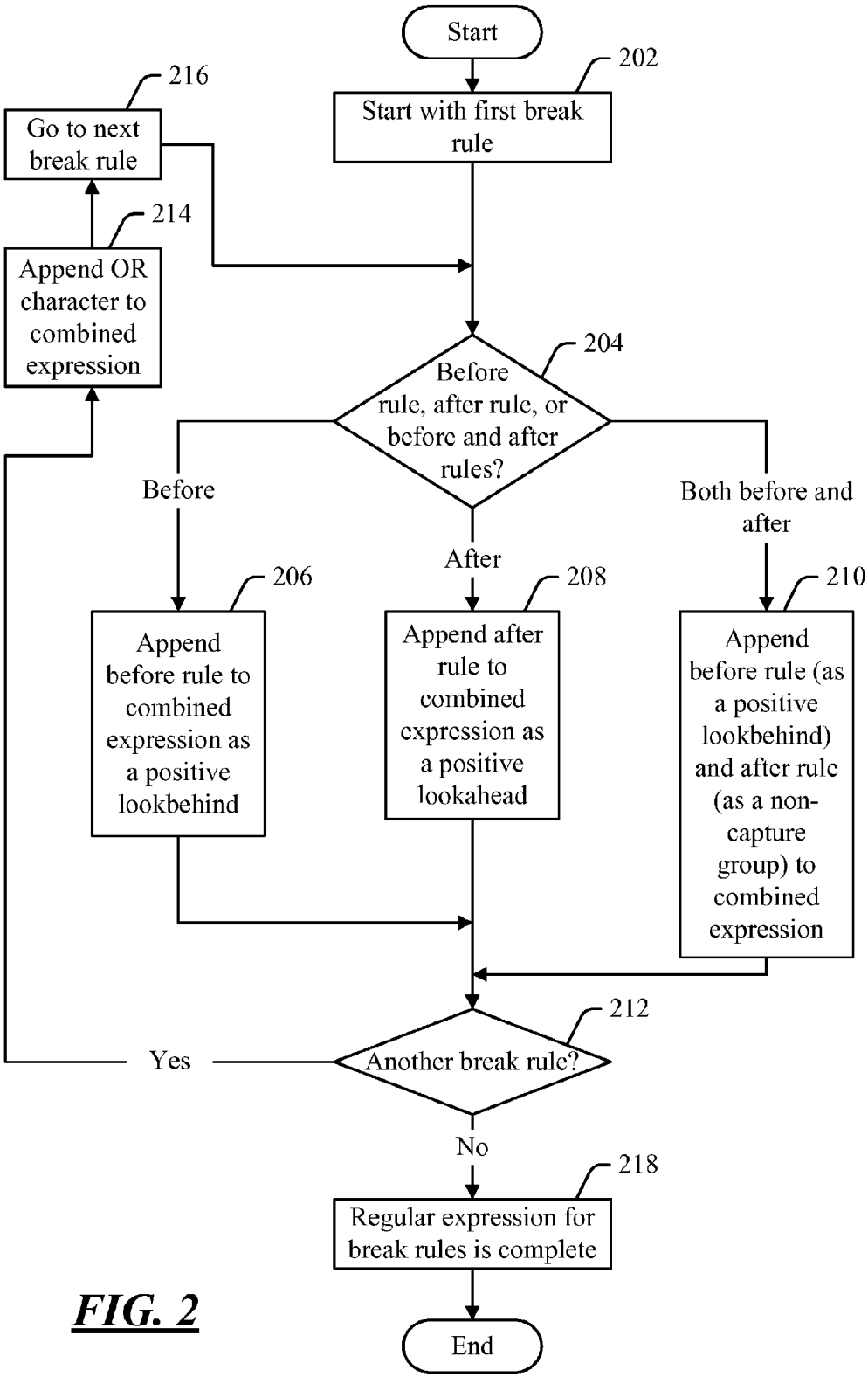
FIG. 2 is a flow diagram of an example process of combining break rules into a single regular expression.

FIG. 2 shows an example process of combining break rules into a single regular expression. The process of FIG. 2 is analogous to that of FIG. 1, in the sense that the process of FIG. 1 creates a combined regular expression for the various expressions, and the process of FIG. 2 creates a combined regular expression for the break rules.

At 202, the process starts with the first of the break rules. Additionally, a "combined expression" string is set to the null string, and acts as an accumulator for the regular expression that the process builds. Break rules may be processed slightly differently from each other, depending on whether they contain a before part, an after part, or both before and after parts. Thus, at 204 it is determined which of these situations applies to the current rule.

If the break contains only a before part (i.e., a regular expression to be matched before a sentence break point), then the regular expression representing this rule is appended to the "combined expression" string as a positive lookbehind (at 206). In a typical regular expression language, the symbol "?<=" indicates a positive lookbehind (i.e., a string that has to appear before the match, but that is not part of the match itself). Thus, if a regular expression has the form "(?<=expr1) expr2", then this regular expression matches any occurrence in the input of expr2, as long as expr2 is immediately preceded by expr1. So, if a break rule has only a before part (which, for this example, is labeled "before-part"), then the string "(?<=before-part)" is appended to the combined expression string.

If the break rule contains only an after part (i.e., a regular expression to be matched after the break point), then the regular expression representing the rule is appended to the combined expression string as a positive lookahead (at 208). In a typical regular expression language, the symbol "?=" indicates a positive lookahead, which is a string that has to appear after the match, but that is not part of the match itself. Thus, if a regular expression is of the form "expr1 (?=expr2)", then this regular expression matches any occurrence in the input of expr1 as long as it is immediately followed by expr2. If a break rule has only an after part (which, for this example, is labeled "after-part"), then the string "(?=after-part)" is appended to the combined expression string.

If the break rule contains both before and after parts, the before part is appended to the combined expression as a positive lookbehind, followed by the after part as a non-capture group (at 210). I.e., if the before and after parts are labeled "before-part" and "after-part", respectively, then the expression (?<=before-part)(?:after-part)" is added to the combined expression.

If there is another break rule to consider (as determined at 212), then the "or" character (such as the vertical bar "|") is appended to the combined expression (at 214), and the process goes on to the next break rule (at 216). The process then returns to 204 to add the next rule to the combined expression in the manner described above. If there are no more break rules to consider, then the combined expression contains the complete regular expression to consider all of the break rules in the disjunctive (at 218), and the process of FIG. 2 ends.

Figure 3:
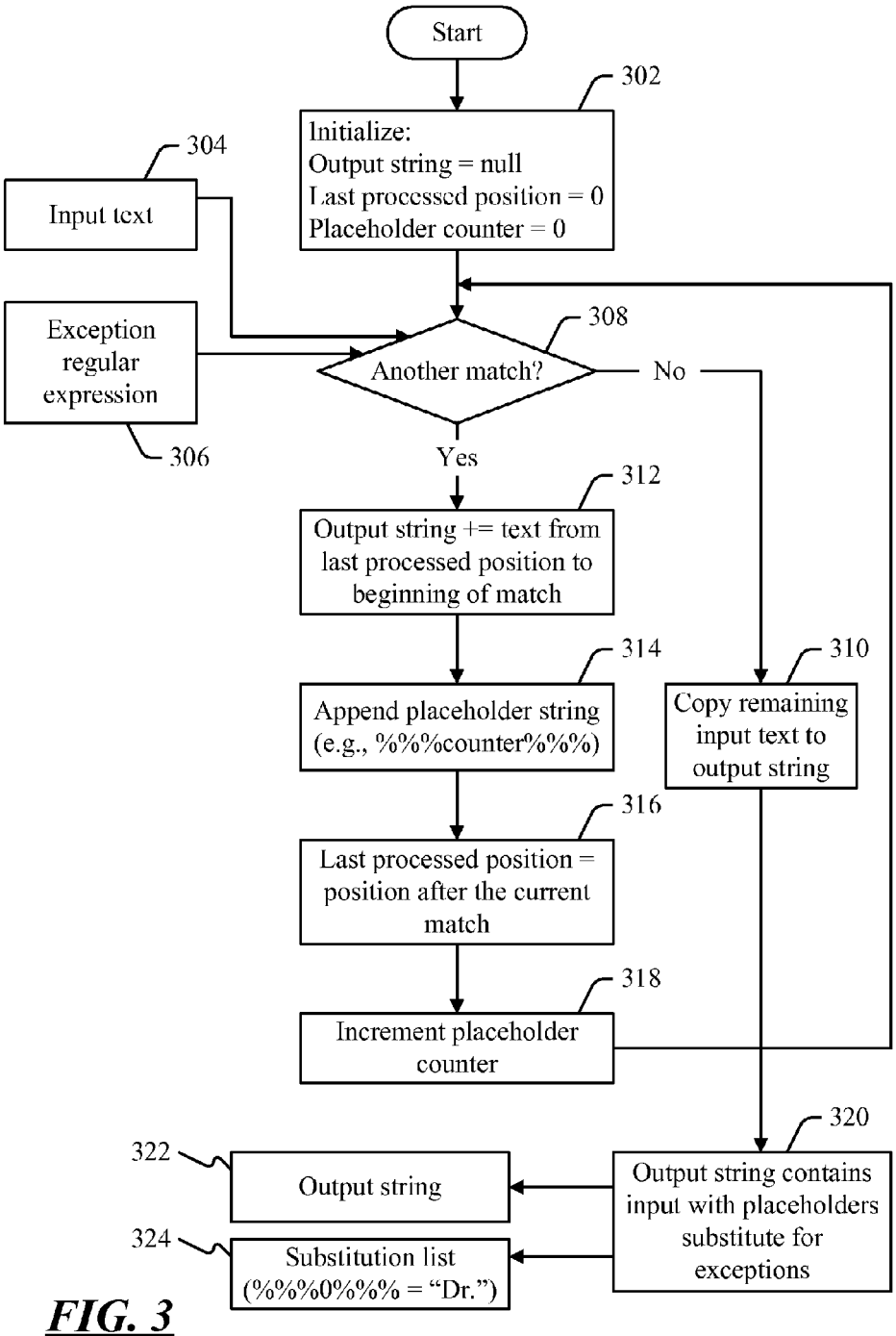
FIGS. 3 and 4 are flow diagrams of an example process in which an input text is processed using exceptions and break rules.
Figure 4:
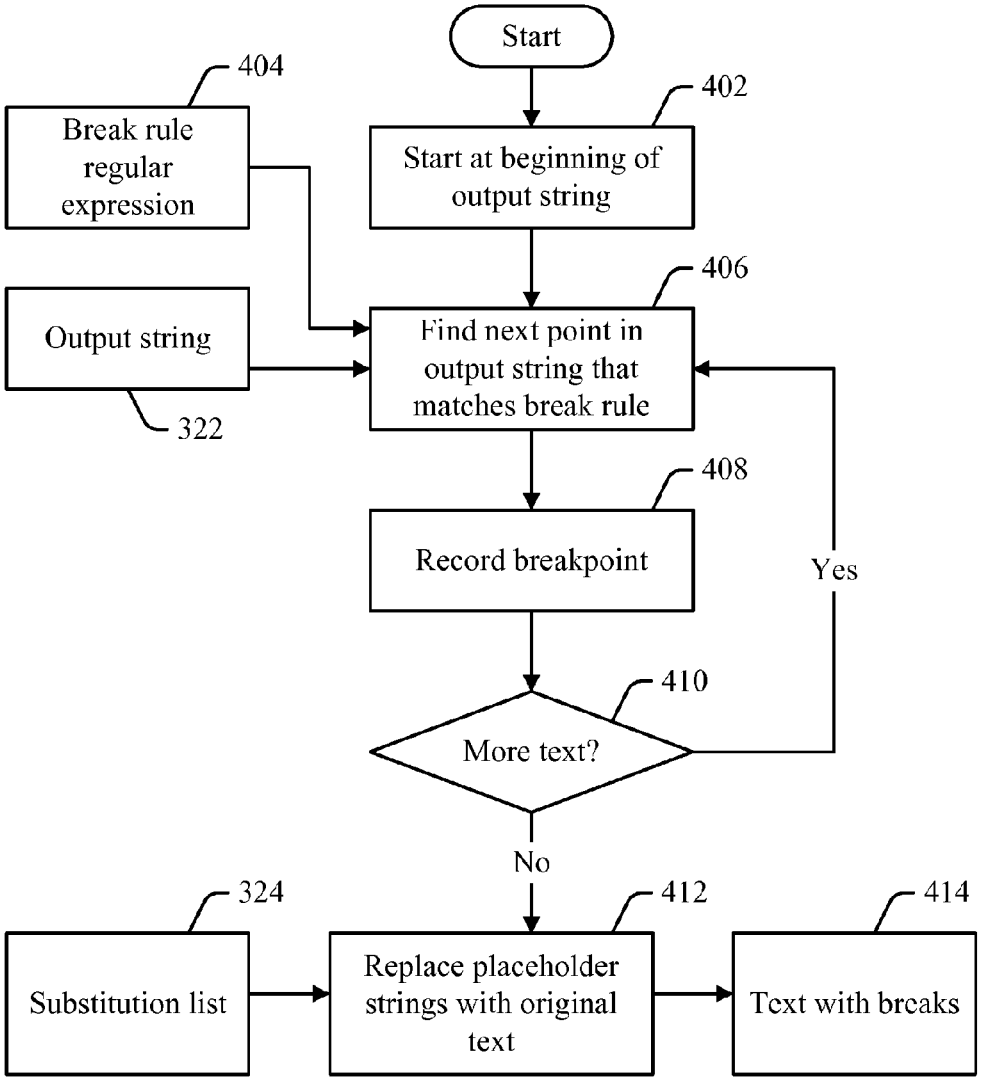

Once the regular expressions have been created for the break rules and for the exceptions, those regular expressions may be used to detect sentence break in an input text. FIGS. 3 and 4 collectively show a process in which an input text is processed using the exceptions and the break rules. The process of FIGS. 3 and 4 may be used to divide input into segments—e.g., to divide natural language text input into sentences.

At 302, the process is initialized by setting certain variables to initial values at 302. For example, a string, referred to as "output string" may be initialized to the null string. Additionally, two numerical variables referred to as "last processed position" and "placeholder counter" may be maintained, and these variables may be initialized to zero. The "output string" variable accumulates the processed text while exception matches are replaced with placeholder strings. The "last processed position" value identifies the offset into the text that corresponds to the last character that has been compared with the regular expression that describes the exceptions. Each placeholder string includes its own number in order to distinguish each placeholder from other placeholders; the number that will be assigned to the next string is stored in the "placeholder counter" variable.

The input to the process of FIG. 3 includes input text 304 and the exception regular expression 306 (i.e., the regular expression that describes all of the exceptions, which was built, for example, by the process of FIG. 1). At 308, it is determined whether there is another match in the input text. If input text 304 contains no strings that match regular expression 306, then it is possible that the 308 results in a "no" answer the first time that 308 is encountered, in which case the process continues to 310. However, if input text 304 contains at least one matching string for the exception regular expression, then the process continues to 312.

At 312, the text from the last processed position up to the position that appears before the first match is appended to the output string. In other words, the text that is being added is text that does not match any exception, and thus can be added to the output string without being replaced with a placeholder string. At 314, a placeholder string is then appended to the output string. The placeholder string may take a form such as "%%%0%%%", where the zero in the middle of the string is the current value of the placeholder counter. The format of the placeholder string may be chosen such that the placeholder string is unlikely to occur naturally in the input text—e.g., English text is unlikely to contain a string that contains three percent signs in a row.

At 316, the "last processed position" value is set to the position after the current match. At 318, the placeholder counter is incremented. The process then returns to 308 to determine whether there is another match to process in the input string. If there are additional matches in the input, then the additional matches are processed according to blocks 312-318. On the other hand, if there are no additional matches in the input, then the process continues to 310, where any as-yet unprocessed portion of the input text 304 is copied to the output string. At this point (at 320), the output string 322 contains all of the input text 304, except that any text that matches an exception has been replaced with a placeholder string. Thus, the result of the actions shown in FIG. 3 is output string 322, plus a substitution list 324. The substitution list 324 indicates the correspondence between original exception strings and their placeholder strings. E.g., if the first and second exceptions in the input are "Dr." and "U.S.", then substitution list 324 may show a correspondence between "%%%0%%%" and "Dr.", and between "%%%1%%%" and "U.S.". The substitution list 324 may be stored in any appropriate format.

FIG. 4 shows how the output string, the substitution list, and the regular expression for the break rules are used to introduce sentence breaks (or other segment breaks) into the original input text. It will be recalled that the "output string" contains the same text as the original input text, except with text that matches exceptions having been replaced with placeholder strings. Thus, the process of FIG. 4 starts, at 402, with the beginning of output string 322. The process then continues to 406, and uses the break rule regular expression 404 (i.e., the regular expression that combined all of the break rules, such as that which was created by the process of FIG. 2), to find the next break in the text. When a match for the break rule regular expression is found, a sentence break (or other segment break) is recorded at the position of the match at 408. Since any exceptions to the break rule have been removed by substituting placeholder strings for those exceptions, any time that a match is found in the output string it is known that a true break occurs at that point; there are no exceptions to consider.

If there is more text to consider in the output string (as determined at 410), the process returns to 406 to find the next break point in the output string. Otherwise, the process continues to 412. At 412, the substitution list 324 is used to replace the placeholder strings with their original text, once the actual sentence break points are known. The result is text 414, which contains the correct breaks.

As one example of how the process of FIGS. 3 and 4 works, the input text might read, "The issue sparked in May after former Texas law professor Dr. Tom Russell published an online article detailing resistance by the university to integration in the 1950s and 1960s. Texas named the dorm after Simkins in 1954, the same year the U.S. Supreme Court's Brown vs. Board of Education decision ended legal segregation." After this input text is processed by the process of FIG. 3, the resulting output string might read, "The issue sparked in May after former Texas law professor %%%0%%% Tom Russell published an online article detailing resistance by the university to integration in the 1950s and 1960s. Texas named the dorm after Simkins in 1954, the same year the %%%1%%% Supreme Court's Brown %%%2%%% Board of Education decision ended legal segregation." This output string is then used as input to the process of FIG. 4. If the sentence break rule is that words ending with a period are the end of a sentence, then the process of FIG. 4 would detect sentence breaks as follows: "The issue sparked in May after former Texas law professor %%%0%%% Tom Russell published an online article detailing resistance by the university to integration in the 1950s and 1960s. <BREAK> Texas named the dorm after Simkins in 1954, the same year the %%%1%%% Supreme Court's Brown %%%2%%% Board of Education decision ended legal segregation. <BREAK>". Then, by substituting the original text for the replacement strings, the resulting broken text is: "The issue sparked in May after former Texas law professor Dr. Tom Russell published an online article detailing resistance by the university to integration in the 1950s and 1960s. <BREAK> Texas named the dorm after Simkins in 1954, the same year the U.S. Supreme Court's Brown vs. Board of Education decision ended legal segregation. <BREAK>".

Figure 5:
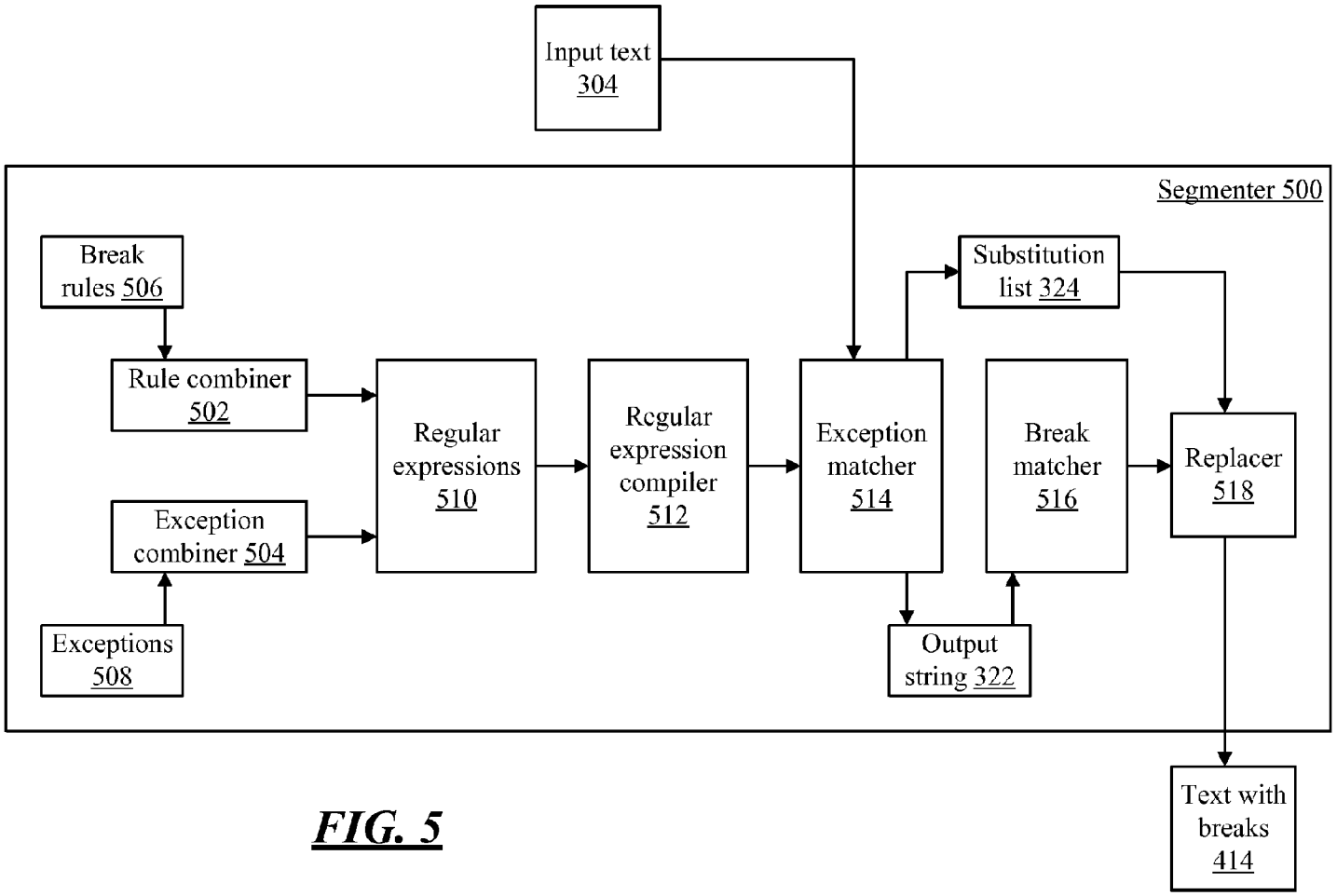
FIG. 5 is a block diagram of an example segmenter that detects break points in an input text.

FIG. 5 shows an example segmenter, having components that detect the sentence break points (or other type of segment break points) in an input text. The components shown in FIG. 5 may be implemented by any appropriate mechanism. In one example, each of the components is a separate hardware component. In another example, each component is a software component.

Segmenter 500 comprises a rule combiner 502 and an exception combiner 504. Rule combiner 502 receives break rules 506, and combines break rules 506 into a regular expression that represents all of the break rules. Similarly, exception combiner 504 receives exceptions 508, and combines them into a regular expression that represents all of the exceptions. The resulting regular expressions 510 may be compiled by regular expression compiler 512. The compiled regular expressions may be efficiently applied to text.

An exception matcher 514 uses the regular expression that represents the exceptions to detect exceptions in input text 304. The output of exception matcher 514 is output string 322, which contains input text 304, but with placeholder strings in place of the exceptions. Exception matcher 514 also produces substitution list 324, which—as noted above—records the correspondence between placeholder strings and the original text. Output string 322 is provided to break matcher 516, which uses the regular expression that represents the break rules to detect the positions of sentence breaks (or other segment breaks) in the output string 322. Replacer 518 uses substitution list 324 to replace the placeholder strings with their original text, thereby generating text 414 that contains the original input text 304, but with sentence breaks in the appropriate positions.

Figure 6:
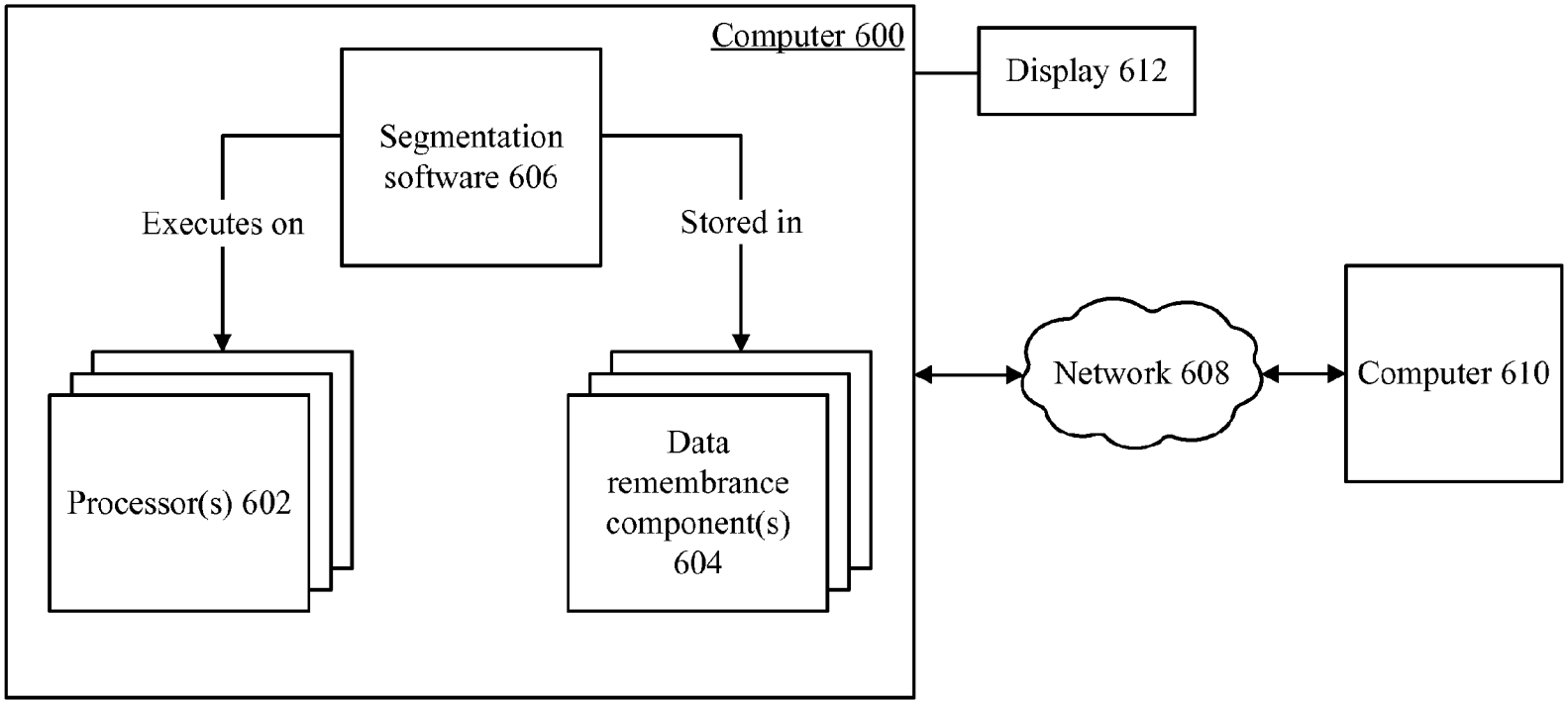
FIG. 6 is a block diagram of example components that may be used in connection with implementations of the subject matter described herein.

FIG. 6 shows an example environment in which aspects of the subject matter described herein may be deployed.

Computer 600 includes one or more processors 602 and one or more data remembrance components 604. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 600 may comprise, or be associated with, display 612, which may be a cathode ray tube (CRT) monitor, a liquid crystal display (LCD) monitor, or any other type of monitor.

Software may be stored in the data remembrance component(s) 604, and may execute on the one or more processor(s) 602. An example of such software is segmentation software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that contain or transmit propagating signals. DVDs, flash memory, magnetic disks, etc., are examples of storage media. On the other hand, wires or fibers on which signals exist ephemerally are examples of transitory signal media.

Additionally, any acts described herein (whether or not shown in a diagram) may be performed by a processor (e.g., one or more of processors 602) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 600 may be communicatively connected to one or more other devices through network 608. Computer 610, which may be similar in structure to computer 600, is an example of a device that can be connected to computer 600, although other types of devices may also be so connected.

It is noted that the term "distinct" is used in various ways herein. In one example, an item may be described as being "distinct" from another item of the same kind. In this usage, "distinct" refers to the two items not being the same item. E.g., if one regular expression is described as being "distinct" from another regular expression, then the two regular expressions are not identical regular expressions. In another context, items may be described as being distinct in the sense that it is possible to distinguish one from another. For example, if one creates "distinct" placeholder strings, then it is meant that, in some population of placeholder strings, the strings are different from each other in the sense that it is possible to distinguish one from the other.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more tangible computer-readable storage media *devices* that store executable instructions to divide an input into segments, wherein the instructions, when executed by a computer, cause the computer to perform acts comprising:

representing one or more segment breaking rules in a first regular expression;

combining a plurality of exceptions to said one or more segment breaking rules disjunctively into a second regular expression, said second regular expression being distinct from said first regular expression;

finding first strings in said input that match said second regular expression;

replacing said first strings with placeholders to create a second string, wherein said second string comprises said input but with said placeholders in place of said first strings;

subsequent to said finding and said replacing, using said first regular expression to detect segment break points in said second string; and subsequent to detecting said segment break points, replacing said placeholders in said second string with said first strings.

2. The one or more tangible computer-readable storage media *devices* of claim 1, wherein said input comprises text in a natural language, wherein said segments comprise sentences in said natural language, and wherein said one or more segment breaking rules comprise one or more rules to divide said natural language into sentences.

3. The one or more tangible computer-readable storage media *devices* of claim 1, wherein said input comprises text in a natural language, and wherein said acts further comprise:

choosing said placeholders to be strings that do not occur in said natural language.

4. The one or more tangible computer-readable storage media *devices* of claim 1, wherein a first one of said exceptions has both a before rule and an after rule, and wherein said first one of said exceptions is included in said second regular expression as a regular expression representing said before rule followed by a non-capture group containing a regular expression representing said after rule.

5. The one or more tangible computer-readable storage media *devices* of claim 1, wherein a first one of said exceptions has either a before rule or an after rule, but not both, and wherein said first one of said exceptions is included in said second regular expression as a regular expression that contains said before rule or said after rule.

6. The one or more tangible computer-readable storage media *devices* of claim 1, wherein a first one of said one or more segment breaking rules has a before break rule, and wherein said first regular expression includes said before break rule as a positive lookbehind.

7. The one or more tangible computer-readable storage media *devices* of claim 1, wherein a first one of said one or more segment breaking rules has an after break rule, and wherein said first regular expression includes said after break rule as a positive lookahead.

8. The one or more tangible computer-readable storage media *devices* of claim 1, wherein a first one of said one or more segment breaking rules has both a before break rule and an after break rule, and wherein said first regular expression includes said before break rule as a positive lookbehind and said after break rule as a non-capture group.

9. The one or more tangible computer-readable storage media *devices* of claim 1, wherein said acts further comprise:

creating a distinct placeholder string for each matching exception; and storing a correspondence between each distinct placeholder string and its matching exception.

10. A method of dividing natural language text into segments, the method comprising:

using a processor to perform acts comprising:

representing one or more sentence breaking rules in a first regular expression, wherein any sentence breaking rule that has both before and after patterns is included in said first regular expression as a positive lookbehind for the before pattern followed by a non-capture group for the after pattern, wherein any sentence break rule that has only a before pattern is included in said first regular expression as a positive lookbehind for the before pattern, and wherein any sentence breaking rule that has only an after pattern is included in said first regular expression as a positive lookahead for the after pattern;

combining a plurality of exceptions to said one or more sentence breaking rules disjunctively into a second regular expression, said second regular expression being distinct from said first regular expression, wherein any exception that has both before and after patterns is included in said second regular expression as the before pattern followed by a non-capture group for the after pattern, and wherein any exception that has only an after pattern or a before pattern but not both is included in said second regular expression as the before or after pattern;

finding first strings in said natural language text that match said second regular expression;

replacing said first strings with placeholders to create a second string, wherein said second string comprises said natural language text but with said placeholders in place of said first strings;

subsequent to said finding and said replacing, using said first regular expression to detect sentence break points in said second string; and subsequent to detecting said sentence break points, replacing said placeholders in said second string with said first strings.

11. The method of claim 10, wherein said acts further comprise:

choosing said placeholders to be strings that do not occur in said natural language.

12. The method of claim 10, wherein said acts further comprise:

creating a distinct placeholder string for each matching exception; and storing a correspondence between each distinct placeholder string and its matching exception.

13. The method of claim 10, wherein said acts further comprise:

maintaining a counter;

including a value of said counter in each placeholder string to create a distinct placeholder string for each matching exception; and incrementing the value of said counter after each match.

14. A system for dividing an input into segments, the system comprising:

a memory;

a processor; and a segmentation component that is stored in said memory and that executes on said processor, wherein said segmentation component represents one or more segment breaking rules in a first regular expression, wherein said segmentation component combines a plurality of exceptions to said one or more segment breaking rules disjunctively into a second regular expression, said second regular expression being distinct from said first regular expression, wherein said segmentation component finds first strings in said input that match said second regular expression, wherein said segmentation component replaces said first strings with placeholders to create a second string, wherein said second string comprises said input but with said placeholders in place of said first strings, wherein said segmentation component uses said first regular expression to detect segment break points in said second string subsequent to finding of said first strings, and wherein said segmentation component replaces said placeholders in said second string with said first strings subsequent to detecting said segment break points.

15. The system of claim 14, wherein said input comprises text in a natural language, and wherein said segmentation component chooses said placeholders to be strings that do not occur in said natural language.

16. The system of claim 14, wherein a first one of said exceptions has both a before rule and an after rule, and wherein said segmentation component includes said first one of said exceptions in said second regular expression as a regular expression representing said before rule followed by a non-capture group containing a regular expression representing said after rule.

17. The system of claim 14, wherein a first one of said exceptions has either a before rule or an after rule, but not both, and wherein said segmentation component includes said first one of said exceptions in said second regular expression as a regular expression that contains said before rule or said after rule.

18. The system of claim 14, wherein a first one of said one or more segment breaking rules has a before break rule, and wherein said first regular expression includes said before break rule as a positive lookbehind.

19. The system of claim 14, wherein a first one of said one or more segment breaking rules has both a before break rule and an after break rule, and wherein said first regular expression includes said before break rule as a positive lookbehind and said after break rule as a non-capture group.

20. The system of claim 14, wherein said segmentation component creates a distinct placeholder string for each matching exception, and stores a correspondence between each distinct placeholder string and its matching exception.

* * * * *